(12) United States Patent
Tashiro

(10) Patent No.: US 8,582,159 B2
(45) Date of Patent: Nov. 12, 2013

(54) CONTROL DEVICE FOR CONTROLLING LIGHT SOURCE ELEMENT AND IMAGE FORMING APPARATUS WITH CONTROL DEVICE BUILT THEREIN

(75) Inventor: Masaya Tashiro, Osaka (JP)

(73) Assignee: Kyocera Mita Corporation (JP)

(*) Notice: Subject to any disclaimer, the term of this patent is extended or adjusted under 35 U.S.C. 154(b) by 466 days.

(21) Appl. No.: 12/952,291

(22) Filed: Nov. 23, 2010

(65) Prior Publication Data

US 2011/0128576 A1 Jun. 2, 2011

(30) Foreign Application Priority Data

Nov. 27, 2009 (JP) ................................. 2009-270189

(51) Int. Cl.
*G06F 15/00* (2006.01)
*H05B 37/02* (2006.01)

(52) U.S. Cl.
USPC ........................... 358/1.15; 358/474; 358/475

(58) Field of Classification Search
USPC .................. 358/1.1, 1.15, 401, 471, 474, 475
See application file for complete search history.

(56) References Cited

U.S. PATENT DOCUMENTS 6,661,545 B2 * 12/2003 Sato et al. ................ 358/509

FOREIGN PATENT DOCUMENTS

JP 2002-94745 3/2002

* cited by examiner

*Primary Examiner* — Thomas D Lee
(74) *Attorney, Agent, or Firm* — Gerald E. Hespos; Michael J. Porco; Matthew T. Hespos

(57) ABSTRACT

Provided is a control device for controlling a light source element configured to irradiate light for reading an image on a document including: a drive portion configured to selectively apply a first drive voltage and a second drive voltage lower than the first drive voltage to the light source element; a detector configured to detect a light quantity of reflected light of the light irradiated to the image; and a control portion configured to control the drive portion and switch between applications of the first drive voltage and the second drive voltage, wherein the control portion controls the drive portion based on a threshold period set in relation to an elapsed period from an application time of the first drive voltage and a threshold light quantity set in relation to the light quantity of the reflected light.

6 Claims, 9 Drawing Sheets

CONTROL DEVICE FOR CONTROLLING LIGHT SOURCE ELEMENT AND IMAGE FORMING APPARATUS WITH CONTROL DEVICE BUILT THEREIN

BACKGROUND OF THE INVENTION

1. Field of the Invention

The present invention relates to a control device configured to control a light source element and an image forming apparatus with the control device built therein.

2. Description of the Related Art

An image forming apparatus such as a copying machine, a facsimile device, a scanner device or a multi functional peripheral (MFP: Multi Functional Peripheral) with their functions typically comprises a linear lamp configured to irradiate light to a document and a CCD sensor (Charged Coupled Device Sensor) configured to receive reflected light from the document. The image forming apparatus generates image data corresponding to an image of the document based on the reflected light received by the CCD sensor.

The image forming apparatus forms a latent image on a circumferential surface of a rotating photoreceptor based on the image data. The image forming apparatus thereafter supplies toner to the latent image to form a toner image. The toner image is transcribed to a sheet conveyed in the image forming apparatus. The toner image is thereafter heated and fixed to the sheet.

The lamp has to emit light of which quantity is a given value or higher for accurate reading of the image with the CCD sensor. The light quantity of the lamp generally depends on amplitude of an applied voltage. A larger applied voltage results in a larger lamp light quantity and shortens a period until the light quantity reaches the given value. On the other hand, a smaller applied voltage results in a smaller lamp light quantity and lengthens the period until the light quantity of the lamp reaches the given value.

Increase in the applied voltage grows a heat value of the lamp. Consequently, the temperature of the lamp more largely rises up.

FIG. 6 is a schematic perspective view of a linear lamp typically used in an image forming apparatus. The lamp is now described with reference to FIG. 6.

The lamp L comprises a cylindrical light emitter E configured to emit light toward a document and support members F configured to support both ends of the light emitter E, respectively. The support member F is mounted, for example, directly or indirectly to a housing of the image forming apparatus. The support member F is typically molded from resin.

In terms of cost reduction in manufacturing image forming apparatuses, the support member F is often molded from less expensive resin. Many types of the inexpensive resin are less heat resistant.

FIG. 7A is a graph schematically showing a relationship between an application period of a voltage applied to the lamp L and the applied voltage. FIG. 7B is a graph schematically showing a relationship between the application period of the voltage applied to the lamp L and an amount of a reflected light from a document. FIG. 7C is a graph schematically showing a relationship between the application period of the voltage applied to the lamp L and a temperature of the lamp L.

A light quantity has to be a given value or higher for accurate reading of the image with the CCD sensor. In order to quickly obtain the light quantity that is a given value or higher, as shown in FIG. 7A, a higher constant voltage is applied to the lamp L. Consequently, an amount of light irradiated from the lamp L increases. As shown in FIG. 7B, as the lamp L increases the light quantity, the amount of the reflected light from the document also goes up. The increase in the light quantity of the lamp L causes a temperature rise of the lamp L, as shown in FIG. 7C. The temperature of the lamp L sometimes increases beyond a heatproof temperature (shown with a dotted line in FIG. 7C) of resin used for the support member F.

FIG. 8A is a graph schematically showing a relationship between an application period of a voltage applied to the lamp L and the applied voltage in an improved image forming apparatus. FIG. 8B is a graph schematically showing a relationship between the application period between the voltage applied to the lamp L and an amount of reflected light from a document in the improved image forming apparatus. FIG. 8C is a graph schematically showing a relationship between the application period of the voltage applied to the lamp L and a temperature of the lamp L in the improved image forming apparatus.

As shown in FIG. 8A, a higher voltage Va is applied to the lamp L in order to quickly obtain a light quantity that is a given value or higher. As the lamp L increases the light quantity, as shown in FIG. 8B, the amount of the reflected light from the document goes up and exceeds a given value of the light quantity (shown with a dotted line in FIG. 8B), so that the CCD sensor accurately reads the image. When the amount of the reflected light from the document exceeds the given value of the light quantity, as shown in FIG. 8A, the applied voltage to the lamp L is switched to a voltage Vb lower than the voltage Va. The voltage Vb is experimentally set forth so that the temperature of the lamp L does not exceed a heatproof temperature of resin used for the support member F. The temperature rise of the lamp L moderates as a result of switching from the voltage Va to the voltage Vb. Accordingly, the lamp L is less likely to increase the temperature over the heatproof temperature of the resin used for the support member F (cf. FIG. 8C).

The control described with reference to FIGS. 8A to 8C sometimes does not moderate the temperature rise of the lamp L. For example, when it takes so long that the lamp L starts to emit after the application of voltage Va, when growth rate of the amount of the light irradiated from the lamp L is so low, or when an element (for example, the foregoing CCD sensor) configured to detect the reflected light less accurately detects the amount of the reflected light, the lamp L controlled as described above potentially causes an excessive temperature rise.

A further improved image forming apparatus comprises a lamp configured to change a timing for starting emission according to a period how long the lamp is placed under a dark environment, an emission circuit configured to light the lamp, a detection element configured to detect a light quantity of the lamp and a control element configured to control the emission circuit. If the light quantity of the lamp after lapse of a predetermined period from the start of the lamp emission falls below a given value, the lighting circuit temporarily turns off the lamp under the control of the control element. The emission circuit thereafter re-lights the lamp under the control of the control element (retry control). The retry control of the control element is likely to prevent erroneous operation of the emission circuit resulting from the delay in the start timing of the lamp emission.

FIG. 9A is a graph schematically showing a relationship between an application period of a voltage applied to the lamp and the applied voltage in the further improved image forming apparatus. FIG. 9B is a graph schematically showing a relationship between the application period of the voltage applied to the lamp and an amount of reflected light from a document in the further improved image forming apparatus. FIG. 9C is a graph schematically showing a relationship between the application period of the voltage applied to the lamp and a temperature of the lamp in the further improved image forming apparatus.

As shown in FIGS. 9A to 9C, the foregoing retry control is performed while the light quantity of the lamp increases. Consequently, a period required for detecting the amount of the reflected light from the document becomes longer. A temperature rise of the lamp moderates independently from variations in the lamp-related element or changes in a peripheral environment of the lamp. As shown in FIG. 9A, however, the temperature rise of the lamp potentially continues because a voltage as great as the voltage before the retry control is also applied to the lamp after the retry control. Consequently, the lamp temperature sometimes exceeds the heatproof temperature of the support member.

SUMMARY OF THE INVENTION

An object of the present invention is to provide a control device configured to prevent an excessive rise in temperature of a light source element and an image forming apparatus with the control device built therein.

The control device for controlling a light source element configured to irradiate light for reading an image on a document according to one aspect of the present invention includes: a drive portion configured to selectively apply a first drive voltage and a second drive voltage lower than the first drive voltage to the light source element; a detector configured to detect a light quantity of reflected light of the light irradiated to the image; and a control portion configured to control the drive portion and switch between applications of the first drive voltage and the second drive voltage, wherein the control portion controls the drive portion based on a threshold period set in relation to an elapsed period from an application time of the first drive voltage and a threshold light quantity set in relation to the light quantity of the reflected light.

The image forming apparatus configured to form a copied image corresponding to an image on a document according to another aspect of the present invention includes: a light source element configured to irradiate light for reading the image; a control device configured to control the light source element; and an image forming unit configured to form the copied image, wherein the control device includes: a drive portion configured to selectively apply a first drive voltage and a second drive voltage lower than the first drive voltage to the light source element; a generating portion configured to generate image data corresponding to the image based on reflected light of the light irradiated to the image; a detector configured to detect a light quantity of the reflected light; and a control portion configured to control the drive portion and switch between applications of the first drive voltage and the second drive voltage, the image forming unit forms the copied image based on the image data, and the control portion controls the drive portion based on a threshold period set in relation to an elapsed period from an application time of the first drive voltage and a threshold light quantity set in relation to the light quantity of the reflected light.

DETAILED DESCRIPTION OF THE PREFERRED EMBODIMENTS

An image forming apparatus according to one embodiment is now described with reference to the accompanied drawings. It should be noted that directional terms such as "up", "down", "left" and "right" used herein are just for clarifying the following description, and should not be interpreted in any limited manners.

Figure 1:
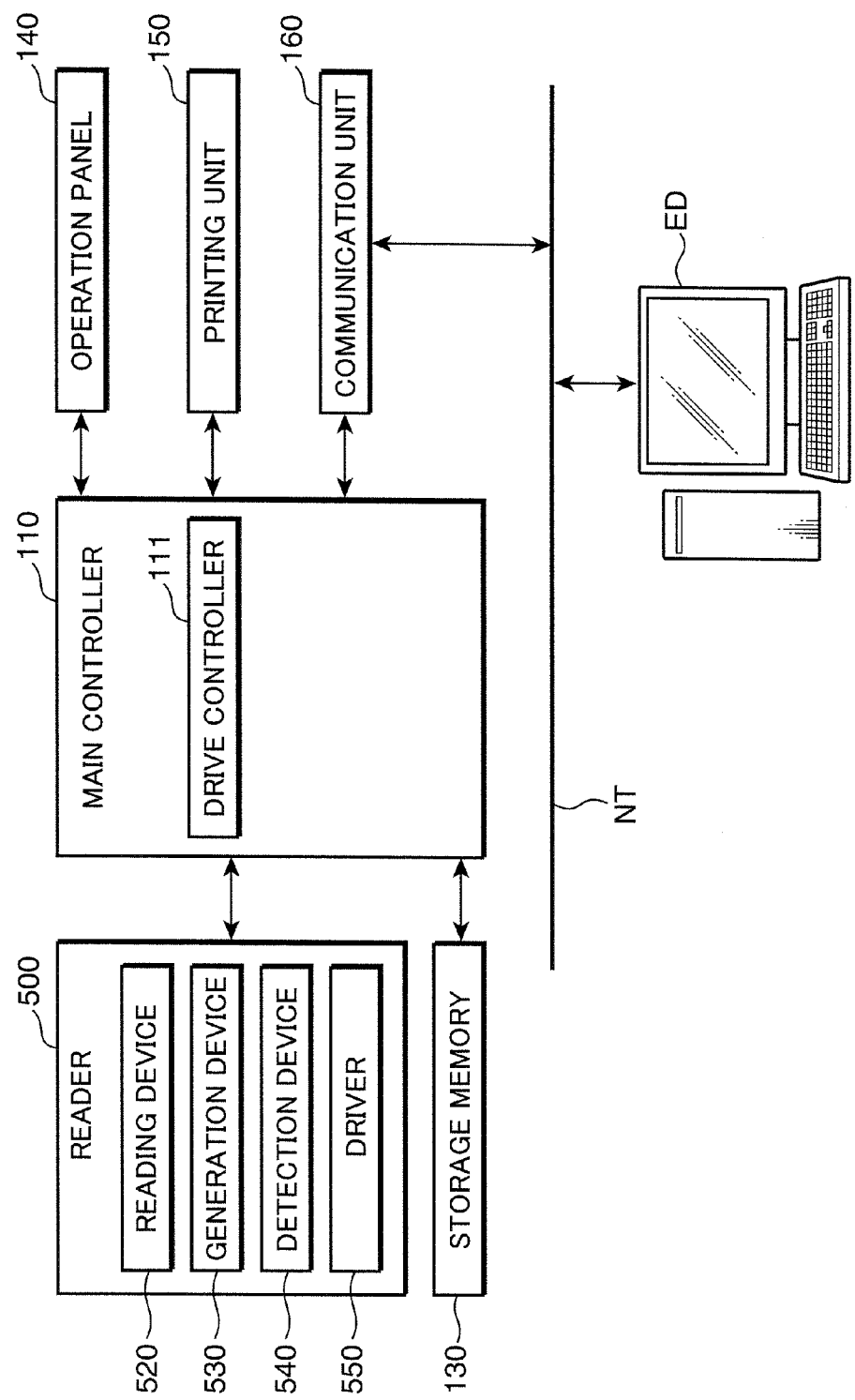
FIG. 1 is a schematic block diagram of the image forming apparatus according to one embodiment.

FIG. 1 is a schematic block diagram of the image forming apparatus. It should be noted that the image forming apparatus shown in FIG. 1 is a multi functional peripheral (MFP) including copying functions and facsimile functions. Alternatively, the image forming apparatus may be a copying machine, a facsimile device, a scanner device or other devices configured to form copied images corresponding to an image of a document. FIG. 1 primarily shows various elements used to control a lamp for reading an image on a document. Accordingly, the image forming apparatus may comprise other various elements to work as a multi functional peripheral.

The multi functional peripheral 100 comprises a main controller 110. The main controller 110 controlling the multi functional peripheral 100 in whole may include, for example, elements such as a CPU, a ROM storing various operation programs of the CPU and a RAM configured to execute various arithmetic processing. The multi functional peripheral 100 further includes a reader 500 configured to read the image of the document, a storage memory 130 configured to store image data corresponding to the image of the document, an operation panel 140 used as an input interface of the multi functional peripheral 100, a printing unit 150 configured to form an image based on the image data and a communication unit 160 configured to communicate with external devices ED such as personal computers via a network NT. The reader 500, the storage memory 130, the operation panel 140, the printing unit 150 and the communication unit 160 exchange necessary data and information with the main controller 110. The reader 500, the storage memory 130, the operation panel 140 and the printing unit 150 may, thereby, appropriately operate under the control of the main controller 110.

Figure 2:
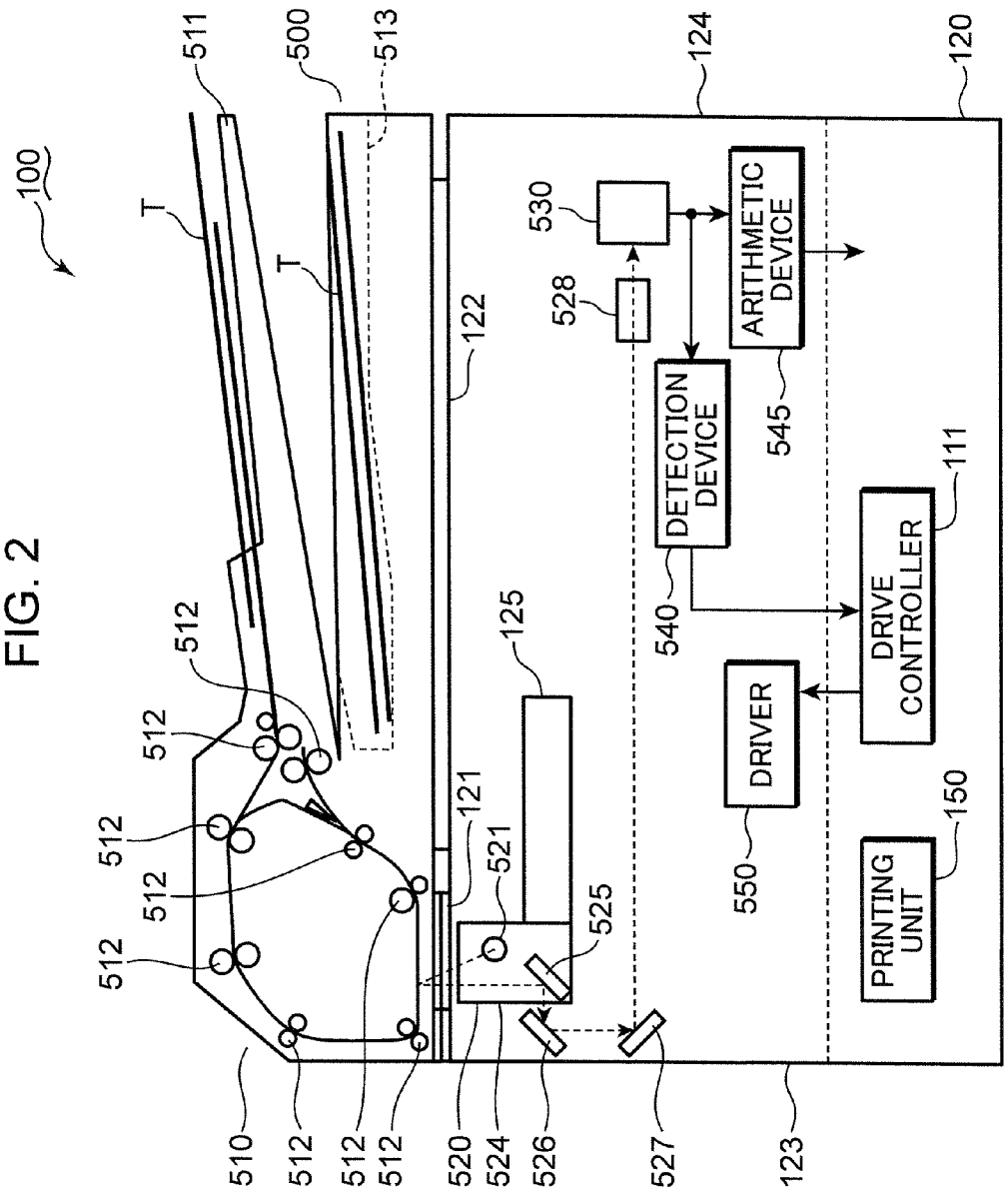
FIG. 2 schematically shows an internal configuration of the image forming apparatus shown in FIG. 1.

FIG. 2 schematically shows a mechanical configuration of the multi functional peripheral 100. The multi functional peripheral 100 is now described in further detail with reference to FIGS. 1 and 2.

The multi functional peripheral 100 comprises a housing 120 configured to accommodate various elements required for forming copied images corresponding to an image of a document T. The reader 500 comprises a conveyor 510 configured to cover an upper surface of the housing 120. The conveyor 510 comprises a document tray 511 on which the documents T are placed and conveyance rollers 512 configured to pull and convey the documents T on the document tray 511 into the conveyor 510. The conveyor 510 further comprises a discharge tray 513 below the document tray 511. The conveyance rollers 512 are deployed along a looped conveyance path defined in the conveyor 510. The document T moved by the conveyance roller 512 along the looped conveyance path in the conveyor 510 is discharged on the discharge tray 513.

The conveyor 510 automatically and sequentially conveys documents T on the document tray 511. The reader 500 equipped with scanner functions optically reads the image of the document T to generate the image data corresponding to the image of the document T. Control to the reader 500 by the main controller 110 will be described later.

The conveyor 510 is connected to the housing 120 so that the conveyor 510 vertically rotates. A connection structure between the conveyor 510 and the housing 120 may be, for example, a hinge mechanism, which is used in typical image forming apparatuses. A user may turn the conveyor 510 upward to directly put the document T on the housing 120. The reader 500 optically reads the image of the document T to generate the image data corresponding to the image of the document T.

The storage memory 130 stores the image data generated by the reader 500 under the control of the main controller 110. In addition, the storage memory 130 may store programs used for the control of the main controller 110. The storage memory 130 may be a hard disk device configured to allow the image data and/or the programs to be read and written.

The operation panel 140 may also be mounted on an outer surface of the housing 120. The operation panel 140 is preferably mounted on an upper part of the housing 120. The user may, thereby, easily operate the operation panel 140.

The operation panel 140 may also comprise a display configured to display, for example, various functions (for example, print processing, copy processing, scanner processing and communication processing of facsimile data) of the multi functional peripheral 100 and/or processing statuses of these functions under the control of the main controller 110. For example, the display may be a liquid crystal panel used in typical image forming apparatuses. The display may also function as a touch panel. The user may use the touch panel function to input various commands to the multi functional peripheral 100.

As shown in FIG. 2, the housing 120 accommodates the printing unit 150. The printing unit 150 may comprise, for example, a feeder (not shown) configured to accommodate sheets. The feeder may be, for example, a feed cassette, which is provided to typical image forming apparatuses. The housing 120 may accommodate one or more feed cassettes. In this embodiment, the sheet may be plain paper, postcard, OHP sheet, cardboard, tracing paper or other sheet-like materials on which copied images are formed.

The printing unit 150 may comprise an image forming unit (not shown). The image forming unit may comprise, for example, a photoconductor drum, a charger configured to charging a circumferential surface of the photoconductor drum, an exposure device configured to irradiate a laser beam to the charged circumferential surface of the photoconductor drum to form a static latent image corresponding to the image data generated by the reader 500, and a development device configured to supply toner to the circumferential surface of the photoconductor drum. The static latent image is developed into a toner image as a result of the toner supply from the development device. In this embodiment, the toner image is exemplified as a copied image. The image forming unit may comprise a transcription device configured to transcribe the toner image formed on the circumferential surface of the photoconductor drum onto the sheet, and a fixation device configured to fix the toner image on the sheet. The various elements such as the photoconductor drum, the charger, the exposure device, the development device, the transcription device and the fixation device may be configured as those which well-known image forming apparatuses comprise. The image forming unit may form color or monochrome copied images. In this embodiment, the printing unit 150 is exemplified as an image forming unit.

The communication unit 160 communicates with the external device ED via the network NT according to a given protocol. The communication unit 160 and the external device ED may communicate various types of information such as image data or document data. The communication unit 160 may also be a communication interface, which is provided to typical image forming apparatuses.

As shown in FIG. 2, the multi functional peripheral 100 comprises transparent contact glasses 121, 122. The substantially rectangular contact glasses 121, 122 mounted on the housing 120 partially form the upper surface of the housing 120. The contact glass 121 adjacent to the contact glass 122 is elongated in comparison to the contact glass 122. The contact glass 121 extending in the main scanning direction, which is orthogonal to a conveyance direction of the document T defined by the conveyor 510 is disposed beside an edge of the upper surface of the housing 120. The contact glass 122 larger than the maximum document T extends in the conveyance direction of the document T from a vicinity of the contact glass 121.

Figure 3:
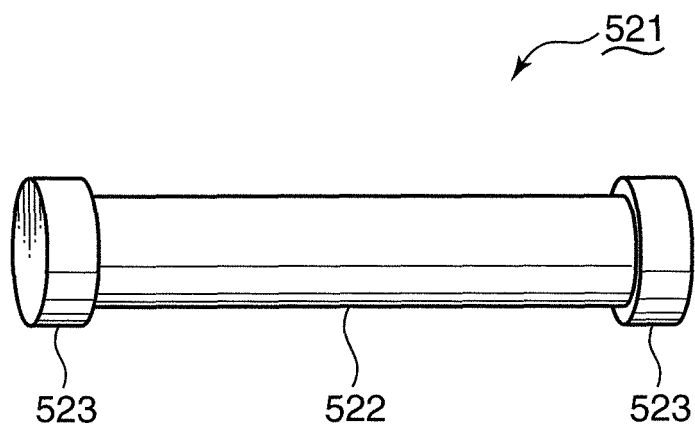
FIG. 3 is a schematic perspective view of a lamp incorporated into a reading device of the image forming apparatus shown in FIG. 2.

FIG. 3 is a schematic perspective view of a lamp configured to irradiate light for reading the image on the document T. The reader 500 is now described with reference to FIGS. 1 to 3.

As shown in FIG. 1, the reader 500 includes a reading device 520. As shown in FIG. 2, the reading device 520 in the housing 120 is disposed immediately below the contact glass 121. The reading device 520 near the contact glass 121 comprises a substantially linear lamp 521 configured to irradiate light for reading the image on the document T. The lamp 521 may be, for example, a xenon lamp or a halogen lamp. In this embodiment, the lamp 521 and/or the reading device 520 is exemplified as a light source element. Instead of the lamp 521, other optical elements configured to emit light with an appropriate light quantity for reading the image on the document T may also be used as the light source element.

As shown in FIG. 3, the lamp 521 comprises a substantially cylindrical light emitter 522 configured to emit light toward the document T, and a resin-based support member 523 configured to support both ends of the light emitter 522. As shown in FIG. 2, the reading device 520 further comprises a resin-based housing 524 configured to accommodate the lamp 521. The support member 523 of the lamp 521 is connected to an inner surface of the housing 524.

The light from the lamp 521 extending in the main scanning direction travels toward the document T on the contact glass 121. The document T reflects the light passed through the contact glass 121.

The reading device 520 further comprises a first mirror 525 inside the housing 524, a second mirror 526 outside the housing 524 and a third mirror 527 below the second mirror 526. The second mirror 526 and the third mirror 527 are mounted inside the housing 120 of the multi functional peripheral 100. The housing 120 includes a left side wall 123 and a right side wall 124. The second mirror 526 and the third mirror 527 are disposed near the left side wall 123. The reflected light from the document T is sequentially reflected off the first mirror 525, the second mirror 526 and the third mirror 527. The third mirror 527 eventually reflects the reflected light from the document T toward the right side wall 124.

The multi functional peripheral 100 further comprises a shifter 125 configured to horizontally shift the reading device 520. For example, when the user turns the conveyor 510 upward and directly put the document T on the contact glasses 121, 122, the shifter 125 moves the reading device 520 along a lower surface of the contact glasses 121, 122. While the reading device 520 reciprocates between the left side wall 123 and the right side wall 124 of the housing 120, the lamp 521 emits light, so that the document T reflects the light of the lamp 521. The reflected light from the document T is sequentially reflected off the first mirror 525, the second mirror 526 and the third mirror 527.

The reading device 520 further comprises collecting lens 528 disposed on the light path of the light reflected off the third mirror 527. The collecting lens 528 collects the reflected light from the document T.

As shown in FIG. 1, the reader 500 further comprises a generation device 530 configured to generate the image data corresponding to the image of the document T based on the reflected light collected by the collecting lens 528. As shown in FIG. 2, the collecting lens 528 sends the collected catoptric light to the generation device 530. The generation device 530 converts the received catoptric light into digital signals, of which level depends on an amount of the reflected light, to generate the image data. The generation device 530 may be, for example, a CCD sensor. In this embodiment, the generation device 530 is exemplified as a generating portion.

As shown in FIG. 1, the reader 500 comprises a detection device 540 configured to detect the amount of the reflected light from the document T based on the image data output from the generation device 530. As shown in FIG. 2, the reader 500 further comprises an arithmetic device 545 configured to perform arithmetic processing to the image data output from the generation device 530.

As described above, light is irradiated from the lamp 521 toward the document T with the target image of the copied image. The document T reflects the light from the lamp 521. The reflected light from the document T travels toward the generation device 530 under a guidance of the first mirror 525, the second mirror 526 and the third mirror 527. The reflected light from the document T is collected by the collecting lens 528, and then reaches the generation device 530. The generation device 530 generates and outputs the image data based on the received catoptric light to the detection device 540 and the arithmetic device 545. The detection device 540 detects the amount of the reflected light from the document T based on the image data from the generation device 530. The arithmetic device 545 performs operations for various types of image processing such as filter processing, enlargement processing and reduction processing on the image data from the generation device 530. The image data subjected to the arithmetic processing by the arithmetic device 545 is stored in the storage memory 130 via the main controller 110. In this embodiment, the detection device 540 is exemplified as a detector.

As shown in FIG. 1, the reader 500 comprises a driver 550 configured to apply a drive voltage to light the lamp 521. The main controller 110 includes a drive controller 111 configured to control the driver 550. As shown in FIG. 2, the detection device 540 is communicably connected to the drive controller 111. The drive controller 111 is communicably connected to the driver 550.

Figure 4A:
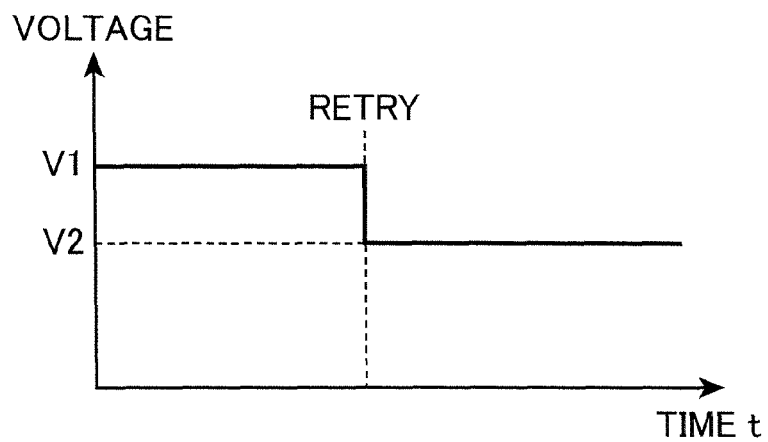
FIG. 4A is a graph schematically showing time variation of a drive voltage applied to the lamp shown in FIG. 3.
Figure 4B:
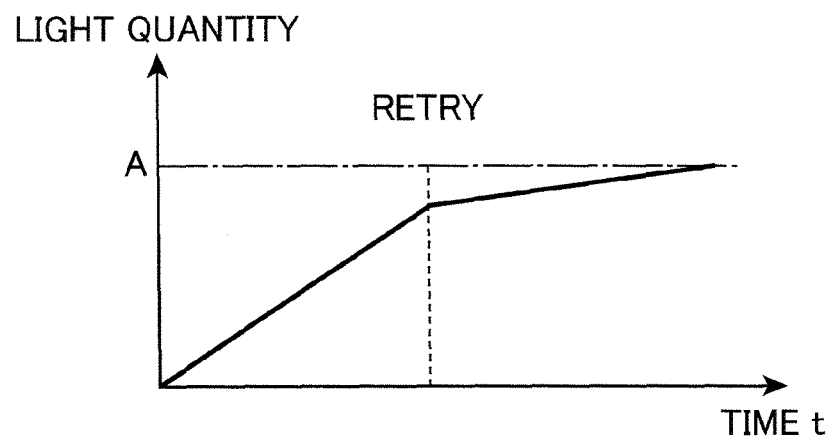
FIG. 4B is a graph schematically showing an amount of reflected light detected in correspondence with the application of the drive voltage shown in FIG. 4A.
Figure 4C:
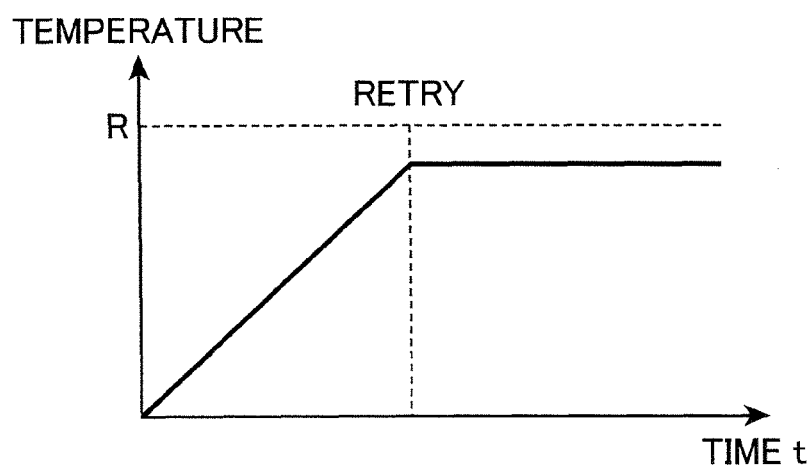
FIG. 4C is a graph schematically showing a temperature of the lamp corresponding to the application of the drive voltage shown in FIG. 4A.

FIG. 4A is a graph schematically showing time variation of the drive voltage applied by the driver 550 to the lamp 521 under the control of the drive controller 111. FIG. 4B is a graph schematically showing time variation of the light quantity detected by the detection device 540 corresponding to the application of the drive voltage shown in FIG. 4A. FIG. 4C is a graph schematically showing time variation of a temperature of the lamp 521 corresponding to the application of the drive voltage shown in FIG. 4A. A control of the drive controller 111 is now described with reference to FIGS. 1 to 4C.

As shown in FIG. 4A, the drive voltage includes a first drive voltage V1 and a second drive voltage V2 smaller than the first drive voltage V1. The driver 550 is configured to selectively apply the first drive voltage V1 and the second drive voltage V2. In this embodiment, the driver 550 is exemplified as a drive portion.

The drive controller 111 is configured to implement a switching control between the applications of the first drive voltage V1 and the second drive voltage V2. As described later, the switching control between the applications of the first drive voltage V1 and the second drive voltage V2 by the drive controller 111 is likely to prevent an excessive temperature rise of the lamp 521. In this embodiment, the drive controller 111 is exemplified as a control portion.

In FIG. 4B, the amount level of the reflected light which is required for generating image data to form a quality copied image is shown as a standard light quantity A with a dashed line. The first drive voltage V1 is set to a higher value so that the light quantity from the document T will more quickly reach the standard light quantity A. The second drive voltage V2 is set to be lower than the first drive voltage V1. For example, the second drive voltage V2 may be approximately ⅔ of the first drive voltage V1. In this embodiment, the amount of the reflected light from the document T which exceeds the standard light quantity A is exemplified as a generation light quantity. Moreover, the reflected light with a light quantity that exceeds the standard light quantity A is exemplified as first reflected light.

If the various elements related to the operation of the lamp 521 such as the lamp 521, the optical system from the first mirror 525 to the collecting lens 528 and the generation device 530 all appropriately operate, a light quantity exceeding the standard light quantity A is detected earlier in the reflected light obtained on the basis of the emission of the lamp 521 to which the first drive voltage V1 is applied. Malfunctions in the various elements related to the operation of the lamp 521 such as the lamp 521, the optical system from the first mirror 525 to the collecting lens 528 and the generation device 530 causes delay or failure in the detection of the light quantity exceeding the standard light quantity A. FIGS. 4A to 4C show the variation in the drive voltage, the amount of the reflected light detected by the detection device 540 and the temperature of the lamp 521, respectively, when the detection of the light quantity exceeding the standard light quantity A is delayed due to malfunctions in the various elements related to the operation of the lamp 521 such as the lamp 521, the optical system from the first mirror 525 to the collecting lens 528 and the generation device 530.

In FIG. 4C, a heatproof temperature R of the support member 523 of the lamp 521 is shown with a dashed line. The second drive voltage V2 is set so that the temperature of the lamp 521 does not exceed the heatproof temperature R. Alternatively, the second drive voltage V2 may also be set based on the heatproof temperature of other elements around the lamp 521 (for example, the resin-based housing 524 of the reading device 520 and other less heat-resistant elements near the lamp 521). Consequently, even if the second drive voltage V2 is continuously applied to the lamp 521 for a longer period, the support member 523 (or other peripheral elements) is less likely to thermally deform (i.e., the support member 523 (or the other peripheral elements) will have a sufficient heatproof temperature to resist the thermal deformation caused by the continuous application of the second drive voltage V2). For example, the second drive voltage V2 is set to a value that is 20% to 30% lower than the standard light quantity A. In this embodiment, the support member 523 and/or the housing 524 is exemplified as a resin portion.

When the user turns on the main power of the multi functional peripheral 100, as shown in FIG. 4, the driver 550 applies the first drive voltage V1 to the lamp 521 under the control of the drive controller 111. The lamp 521 to which the first drive voltage V1 is applied irradiates light toward the document T. The document T reflects the light. The generation device 530 generates image data based on the reflected light from the document T. The detection device 540 detects the amount of the reflected light from the document T based on the image data. A threshold is set in advance in relation to the light quantity to be detected by the detection device 540. In this embodiment, the threshold that is set in advance in relation to the light quantity to be detected by the detection device 540 is exemplified as a threshold light quantity.

The drive controller 111 measures elapsed period from the application time of the first drive voltage V1. A threshold is set in relation to the elapsed period from the application time of the first drive voltage V1. The threshold in relation to the elapsed period from the application time of the first drive voltage V1 is appropriately set on the basis of the heatproof temperature of the support member 523 of the lamp 521 or the housing 524 of the reading device 520. The threshold is set to a period shorter than a period in which the thermal deformation of the support member 523 or the housing 524 will occur due to the continuous application of the first drive voltage V1. Accordingly, even if the first drive voltage V1 is continuously applied during the period defined by the threshold, there is little thermal deformation of the resin-based support member 523 and housing 524. In this embodiment, the threshold that is set in advance in relation to the elapsed period from the application time of the first drive voltage V1 is exemplified as a threshold period. The drive controller 111 controls the driver 550 to adjust the light quantity of the lamp 521 based on the thresholds set in advance in relation to the light quantity detected by the detection device 540 and the elapsed period from the application time of the first drive voltage V1, respectively.

As shown in FIG. 4A and FIG. 4B, if the reflected light amount exceeding the standard light quantity A is not detected within the threshold period, the drive controller 111 executes the switching control from the application of the first drive voltage V1 to the application of the second drive voltage V2. Based on the switching control, the driver 550 applies the second drive voltage V2 to the lamp 521.

If the reflected light amount exceeding the standard light quantity A is detected within the threshold period, the drive controller 111 similarly performs the switching control from the application of the first drive voltage V1 to the application of the second drive voltage V2. Consequently, the excessive temperature rise of the lamp 521 is prevented.

Figure 5:
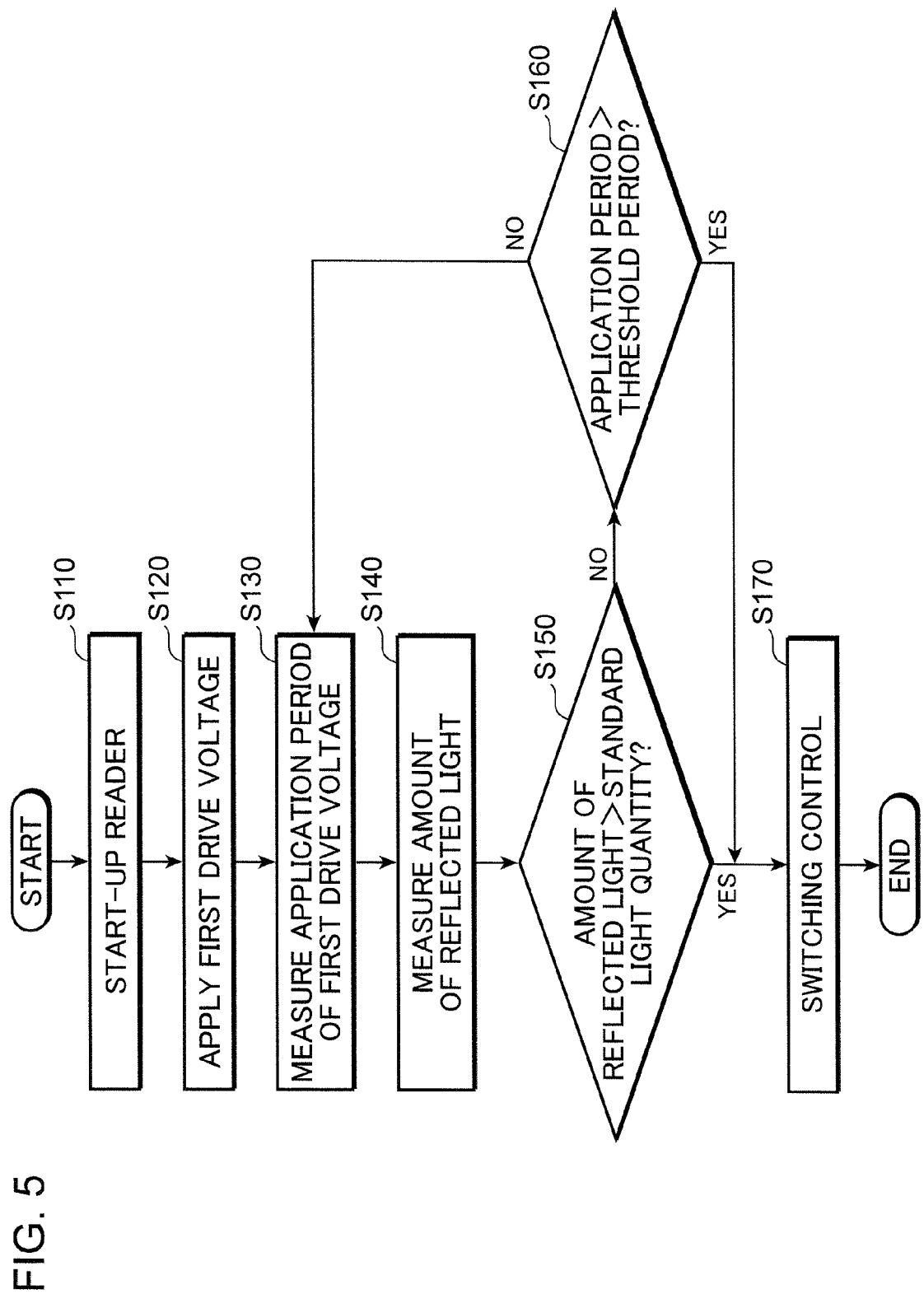
FIG. 5 is a flowchart schematically showing operation of the image forming apparatus shown in FIG. 1.
Figure 6:
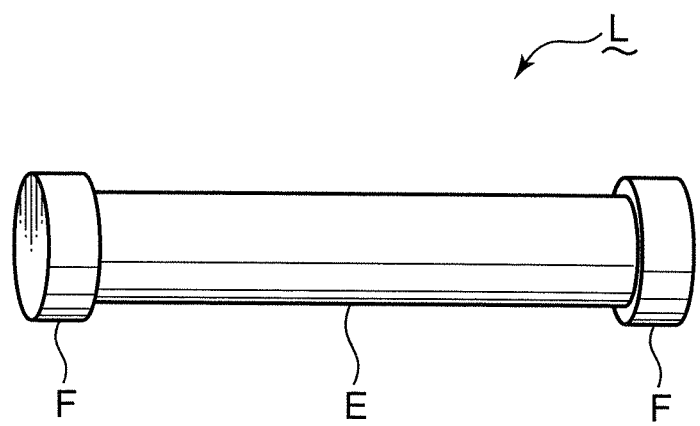
FIG. 6 is a schematic perspective view of the lamp used in a conventional image forming apparatus.
Figure 7A:
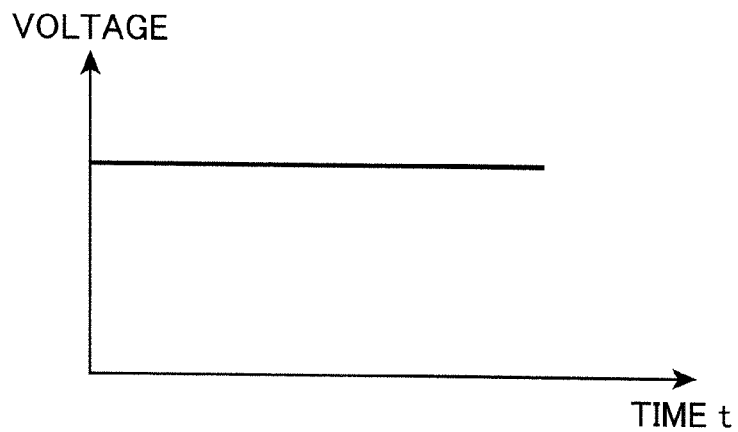
FIG. 7A is a graph schematically showing an application of a drive voltage to the lamp implemented by a conventional image forming apparatus.
Figure 7B:
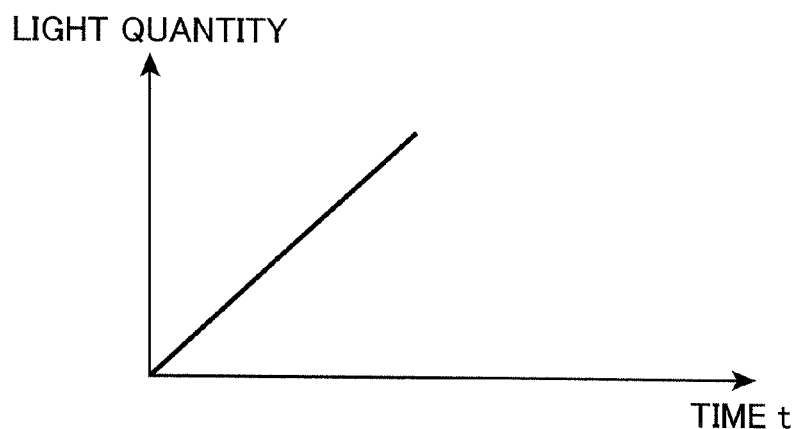
FIG. 7B is a graph schematically showing time variation of an amount of reflected light detected in correspondence with the application of the drive voltage shown in FIG. 7A.
Figure 7C:
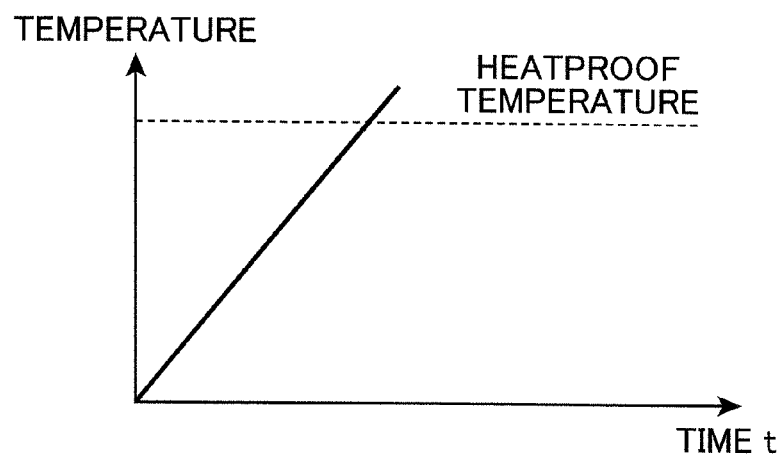
FIG. 7C is a graph schematically showing a temperature of the lamp corresponding to the application of the drive voltage shown in FIG. 7A.
Figure 8A:
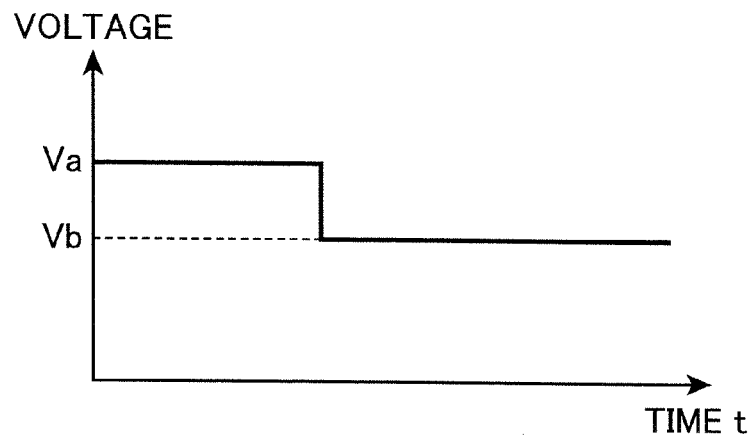
FIG. 8A is a graph schematically showing an application of a drive voltage to a lamp implemented by an improved conventional image forming apparatus.
Figure 8B:
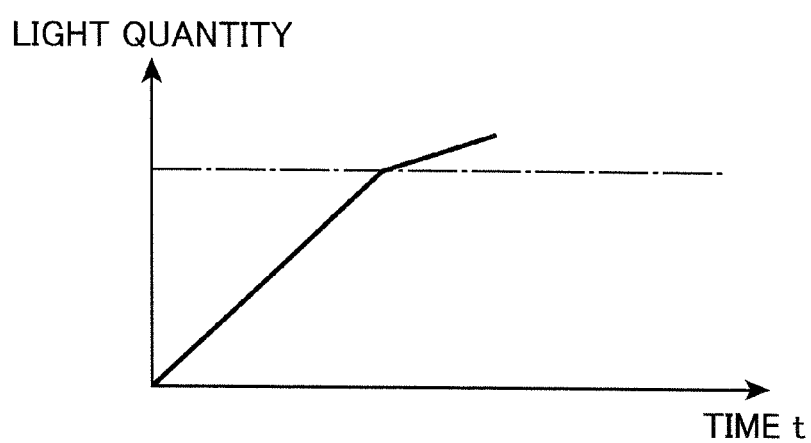
FIG. 8B is a graph schematically showing time variation of an amount of reflected light detected in correspondence with the application of the drive voltage shown in FIG. 8A.
Figure 8C:
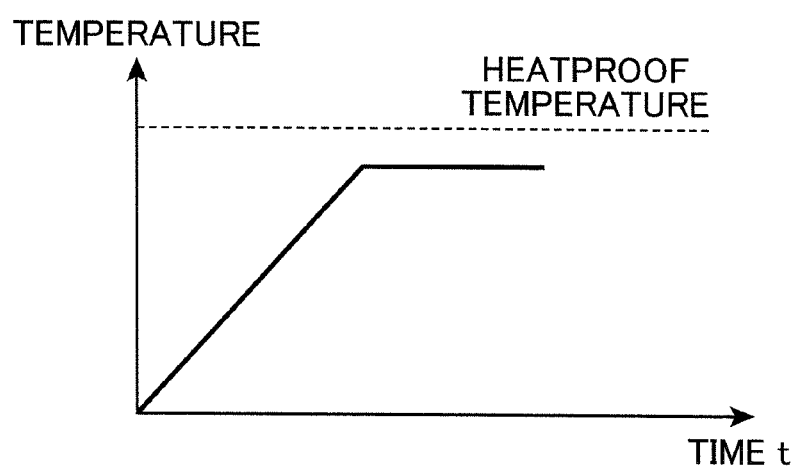
FIG. 8C is a graph schematically showing time variation of a temperature of the lamp corresponding to the application of the drive voltage shown in FIG. 8A.
Figure 9A:
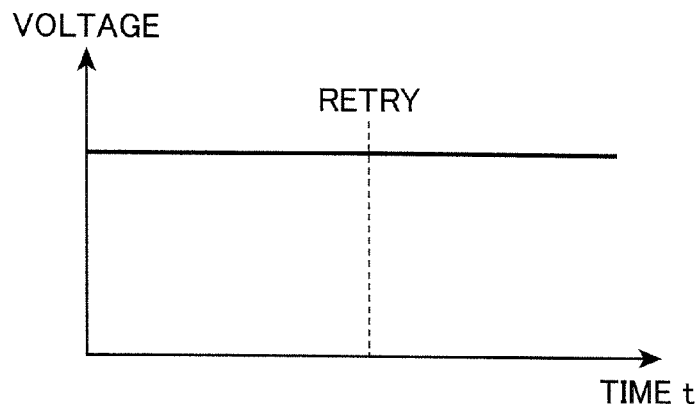
FIG. 9A is a graph schematically showing an application of a drive voltage to a lamp implemented by a further improved conventional image forming apparatus.
Figure 9B:
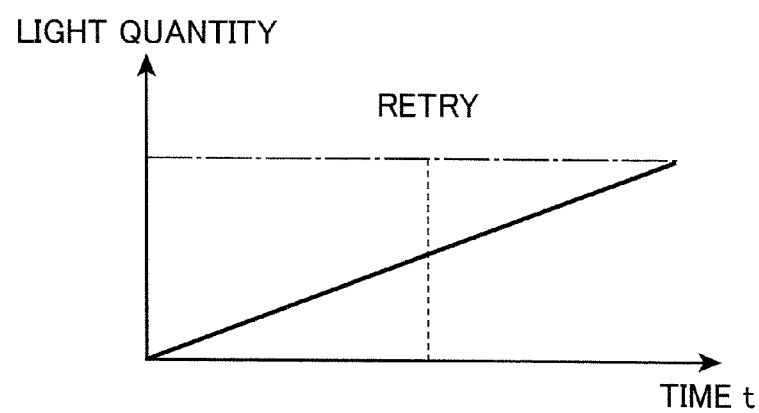
FIG. 9B is a graph schematically showing time variation of an amount of reflected light detected in correspondence with the application of the drive voltage shown in FIG. 9A.
Figure 9C:
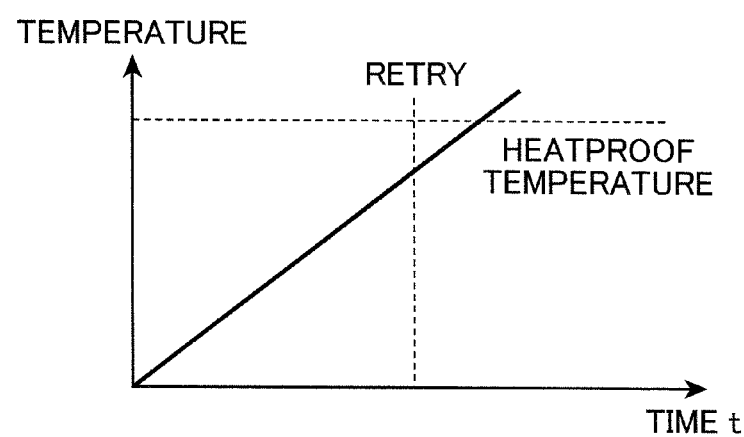
FIG. 9C is a graph schematically showing time variation of a temperature of the lamp corresponding to the application of the drive voltage shown in FIG. 9A.

FIG. 5 is a flowchart schematically showing operation of the multi functional peripheral 100. The operation of the multi functional peripheral 100 is now described with reference to FIGS. 1 to 5.

(Step S110)

When the user turns on the power of the multi functional peripheral 100, the reader 500 is started up. Step S120 is thereafter executed.

(Step S120)

When the reader 500 is started up, the driver 550 applies the first drive voltage V1 to the lamp 521 under the control of the drive controller 111. Step S130 is thereafter executed.

(Step S130)

The drive controller 111 measures the elapsed period from the application time of the first drive voltage V1 from the driver 550 approximately at the same time as when the driver 550 performs control for applying the first drive voltage V1. Step S140 is thereafter executed.

(Step S140)

The lamp 521 emits light based on the application of the first drive voltage V1 by the driver 550 (step S120). Consequently, the detection device 540 detects the amount of the reflected light from the document T. Step S150 is thereafter executed.

(Step S150)

The drive controller 111 compares the amount of the reflected light detected by the detection device 540 with the predetermined standard light quantity A. If the standard light quantity A is greater than the amount of the reflected light, step S160 is executed. If the amount of the reflected light is greater than the standard light quantity A, step S170 is executed.

(Step S160)

The drive controller 111 compares the measured application period with the predetermined threshold period. If the threshold period is longer than the measured application period, step S130 is executed. If the measured application period is longer than the threshold period, step S170 is executed.

(Step S170)

The driver 550 applies the second drive voltage V2 to the lamp 521 instead of the first drive voltage V1 based on the switching control of the drive controller 111.

The switching from the first drive voltage V1 to the second drive voltage V2 based on the switching control of the drive controller 111 prevents the excessive temperature rise of the lamp 521.

In this embodiment, the element group including the driver 550, the detection device 540 and the drive controller 111 are exemplified as a control device. The lamp 521 (or reading device 520) exemplified as the light source element irradiates the light for reading the image of the document T. The driver 550 selectively applies the first drive voltage V1 and the second drive voltage V2 smaller than the first drive voltage V1 to the lamp 521. The lamp 521 emits the light based on the application of the first drive voltage V1 or the second drive voltage V2. The document T reflects the light from the lamp 521. The generation device 530 exemplified as the generating portion generates the image data based on the reflected light from the document T. The detection device 540 exemplified as the detector detects the amount of the reflected light from the document T. The driver 550 exemplified as the drive portion applies the first drive voltage V1 to the lamp 521 under the control of the drive controller 111. If the elapsed period from the application start time of the first drive voltage V1 exceeds the predetermined threshold period, the drive controller 111 exemplified as the control portion executes the switching control if the amount of the reflected light detected by the detection device 540 does not exceed the standard light quantity A. Consequently, the driver 550 applies the second drive voltage V2 to the lamp 521 instead of the first drive voltage V1.

After the first drive voltage V1 is applied to the lamp 521, even if the detection device 540 does not detect a sufficient amount of the reflected light, the excessive temperature rise of the lamp 521 is prevented by switching the applied voltage to the second drive voltage V2. Consequently, thermal deformation or melting of the support member 523 of the lamp 521, the housing 524 of the reading device 520 or other elements around the lamp 521 hardly occurs.

The maximum application period of the first drive voltage V1 is defined in advance based on the threshold period. The threshold period is set to be shorter than the period in which the thermal deformation or melting of the support member 523 of the lamp 521, the housing 524 of the reading device 520 or other elements around the lamp 521 starts. When the application period of the first drive voltage V1 reaches the threshold period, the foregoing switching control is performed so that the second drive voltage V2 is applied to the lamp 521. Consequently, thermal deformation or melting of the support member 523 of the lamp 521, the housing 524 of the reading device 520 or other elements around the lamp 521 hardly occurs.

The amplitude of the second drive voltage V2 is set so that the amount of the reflected light from the document T arising from the emission of the lamp 521 to which the second drive voltage V2 is applied may be 20% to 30% lower than the standard light quantity A. Accordingly, thermal deformation or melting of the support member 523 of the lamp 521, the housing 524 of the reading device 520 or other elements around the lamp 521 which is caused by the application of the second drive voltage V2 hardly occurs.

The amplitude of the second drive voltage V2 is preferably set on the basis of a heat resistance of the support member 523 of the lamp 521, the housing 524 of the reading device 520 or other elements around the lamp 521. The amplitude of the second drive voltage V2 is preferably set so that thermal deformation or melting of the support member 523 of the lamp 521, the housing 524 of the reading device 520, or other elements around the lamp 521 which is caused by the application of the second drive voltage V2 hardly occurs.

In this embodiment, the driver 550 is configured to selectively apply the first drive voltage V1 and the second drive voltage V2. Alternatively, the driver 550 may also be configured to apply a third drive voltage smaller than the second drive voltage V2 in addition to the first drive voltage V1 and the second drive voltage V2. The driver 550 selectively applies the first drive voltage V1, the second drive voltage V2 and the third drive voltage to the lamp 521.

After step S170 described in the context of FIG. 5 is executed, if the detection device 540 does not detect the amount of the reflected light exceeding the standard light quantity A for a given period, the drive controller 111 may perform the switching control from the second drive voltage V2 to the third drive voltage. As a result of the foregoing switching control, the driver 550 applies the third drive voltage to the lamp 521.

The control device for controlling a light source element configured to irradiate light for reading an image on a document according to one aspect of the foregoing embodiment includes: a drive portion configured to selectively apply a first drive voltage and a second drive voltage lower than the first drive voltage to the light source element; a detector configured to detect a light quantity of reflected light of the light irradiated to the image; and a control portion configured to control the drive portion and switch between applications of the first drive voltage and the second drive voltage, wherein the control portion controls the drive portion based on a threshold period set in relation to an elapsed period from an application time of the first drive voltage and a threshold light quantity set in relation to the light quantity of the reflected light.

According to the foregoing configuration, the control device controls the light source element configured to irradiate the light for reading the image on the document. The drive portion of the control device selectively applies the first drive voltage and the second drive voltage lower than the first drive voltage to the light source element. The detector of the control device detects the amount of the reflected light of the irradiated light to the image. The control portion controls the drive portion and switches between the applications of the first drive voltage and the second drive voltage. The control for the drive portion by the control portion is based on the threshold period set in relation to the elapsed period from the application time of the first drive voltage and the threshold light quantity set in relation to the light quantity of the reflected light. Since the applications of the first drive voltage and the second drive voltage are switched according to the elapsed period from the application time of the first drive voltage as well as the amount of reflected light, temperature of the light source element is less likely to excessively increase.

In the foregoing configuration, preferably, if the light quantity of the reflected light falls below the threshold light quantity when the elapsed period from the application time of the first drive voltage goes over the threshold period, the control portion applies the second drive voltage to the drive portion.

According to the foregoing configuration, if the light quantity of the reflected light falls below the threshold light quantity when the elapsed period from the application time of the first drive voltage goes over the threshold period, the control portion applies the second drive voltage to the drive portion. Therefore the temperature of the light source element is less likely to excessively increase.

In the foregoing configuration, preferably, the light source element includes a light emitter configured to emit the light and a resin portion adjacent to the light emitter, and the threshold period is set to be shorter than a period in which deformation of the resin portion begins due to a continuous application of the first drive voltage.

According to the foregoing configuration, the light source element includes a light emitter configured to emit the light and a resin portion adjacent to the light emitter. The threshold period is set to be shorter than a period in which deformation of the resin portion begins due to the continuous application of the first drive voltage. Therefore, the resin portion is less likely to deform.

In the foregoing configuration, preferably, a generating portion configured to generate image data corresponding to the image based on the reflected light, wherein the document reflects a first generation light with a generation light quantity for generating the image data when the first drive voltage is applied, and the threshold light quantity is set to a light quantity that is 20% to 30% lower than the generation light quantity.

According to the foregoing configuration, the control device further includes a generating portion configured to generate image data corresponding to the image based on the reflected light. The document reflects a first generation light with a generation light quantity for generating the image data when the first drive voltage is applied. The threshold light quantity is set to a light quantity that is 20% to 30% lower than the creation light quantity. If the reflected light from the document falls below the threshold light quantity due to some sort of malfunction, the control portion controls the drive portion so that a second drive voltage lower than the first drive voltage is applied to the light source element. Therefore the temperature of the light source element is less likely to excessively increase.

In the foregoing configuration, preferably, the resin portion has a heatproof temperature to resist thermal deformation caused by a continuous application of the second drive voltage.

According to the foregoing configuration, since the resin portion has a heatproof temperature to resist the thermal deformation caused by the continuous application of the second drive voltage, the resin portion is less likely to deform due to the continuous application of the second drive voltage.

In the foregoing configuration, preferably, the drive portion is configured to apply a third drive voltage lower than the second drive voltage to the light source element, and if a light quantity obtained as a result of the application of the second drive voltage falls below the threshold light quantity, the control portion applies the third drive voltage to the drive portion.

According to the foregoing configuration, the drive portion is configured to apply the third drive voltage lower than the second drive voltage to the light source element. If a light quantity obtained as a result of the application of the second drive voltage falls below the threshold light quantity, the control portion applies the third drive voltage to the drive portion. Therefore the temperature of the light source element is less likely to excessively increase.

The image forming apparatus configured to form a copied image corresponding to an image on a document according to another aspect of the foregoing embodiment includes: a light source element configured to irradiate light for reading the image; a control device configured to control the light source element; and an image forming unit configured to form the copied image, wherein the control device includes: a drive portion configured to selectively apply a first drive voltage and a second drive voltage lower than the first drive voltage to the light source element; a generating portion configured to generate image data corresponding to the image based on reflected light of the light irradiated to the image; a detector configured to detect a light quantity of the reflected light; and a control portion configured to control the drive portion and switch between applications of the first drive voltage and the second drive voltage, the image forming unit forms the copied image based on the image data, and the control portion controls the drive portion based on a threshold period set in relation to an elapsed period from an application time of the first drive voltage and a threshold light quantity set in relation to the light quantity of the reflected light.

According to the foregoing configuration, the image forming apparatus forms the copied image corresponding to the image on the document. The light source element of the image forming apparatus irradiates the light for reading the image under the control of the control device. The image forming unit forms the copied image. The drive portion of the control device selectively applies a first drive voltage and a second drive voltage lower than the first drive voltage to the light source element. The generating portion generates the image data corresponding to the image based on the reflected light of the irradiated light to the image. The image forming unit forms the copied image based on the image data. The detector of the control device detects the light quantity of the reflected light of the irradiated light to the image. The control portion controls the drive portion and switches between the applications of the first drive voltage and the second drive voltage. The control for the drive portion by the control portion is based on the threshold period set in relation to the elapsed period from the application time of the first drive voltage and the threshold light quantity set in relation to the light quantity of the reflected light. Since the application of the first drive voltage and the application of the second drive voltage are switched according to the elapsed period from the application time of the first drive voltage as well as the amount of reflected light. Therefore the temperature of the light source element is less likely to excessively increase.

This application is based on Japanese Patent application serial No. 2009-270189 filed in Japan Patent Office on Nov. 27, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for controlling a light source element configured to irradiate light for reading an image on a document comprising:
   a drive portion configured to selectively apply a first drive voltage and a second drive voltage lower than the first drive voltage to the light source element;
   a detector configured to detect a light quantity of reflected light of the light irradiated to the image; and
   a control portion configured to control the drive portion and switch between applications of the first drive voltage and the second drive voltage,
   wherein the control portion controls the drive portion based on a threshold period set in relation to an elapsed period from an application time of the first drive voltage and a threshold light quantity set in relation to the light quantity of the reflected light, and
   wherein, if the light quantity of the reflected light falls below the threshold light quantity when the elapsed period from the application time of the first drive voltage goes over the threshold period, the control portion applies the second drive voltage to the drive portion.

2. The control device according to claim 1,
   wherein the light source element includes a light emitter configured to emit the light and a resin portion adjacent to the light emitter, and the threshold period is set to be shorter than a period in which deformation of the resin portion begins due to a continuous application of the first drive voltage.

3. The control device according to claim 2, wherein the resin portion has a heatproof temperature to resist thermal deformation caused by a continuous application of the second drive voltage.

4. The control device according to claim 1, further comprising:
a generating portion configured to generate image data corresponding to the image based on the reflected light,
wherein the document reflects a first generation light with a generation light quantity for generating the image data when the first drive voltage is applied, and
the threshold light quantity is set to a light quantity that is 20% to 30% lower than the generation light quantity.

5. The control device according to claim 1, wherein the drive portion is configured to apply a third drive voltage lower than the second drive voltage to the light source element, and
if a light quantity obtained as a result of the application of the second drive voltage falls below the threshold light quantity, the control portion applies the third drive voltage to the drive portion.

6. An image forming apparatus for forming a copied image corresponding to an image on a document, the apparatus comprising:
a light source element configured to irradiate light for reading the image;
a control device configured to control the light source element; and
an image forming unit configured to form the copied image,
wherein the control device includes:
a drive portion configured to selectively apply a first drive voltage and a second drive voltage lower than the first drive voltage to the light source element;
a generating portion configured to generate image data corresponding to the image based on reflected light of the light irradiated to the image;
a detector configured to detect a light quantity of the reflected light; and
a control portion configured to control the drive portion and switch between applications of the first drive voltage and the second drive voltage,
the image forming unit forms the copied image based on the image data,
the control portion controls the drive portion based on a threshold period set in relation to an elapsed period from an application time of the first drive voltage and a threshold light quantity set in relation to the light quantity of the reflected light, and
if the light quantity of the reflected light falls below the threshold light quantity when the elapsed period from the application time of the first drive voltage goes over the threshold period, the control portion applies the second drive voltage to the drive portion.

* * * * *